United States Patent Office 2,863,721
Patented Dec. 9, 1958

2,863,721

METHOD OF TREATING MICA

Harold S. Endicott, Schenectady, and George E. Ledges, Dryden, N. Y., assignors to General Electric Company, a corporation of New York No Drawing. Application September 16, 1957
Serial No. 683,955

5 Claims. (Cl. 23—110)

Our invention relates to a method of treating mica and, more particularly, to a method of treating phlogopite mica to form an improved dielectric material with a high resistivity in a temperature range of 300° C. and above.

There are two distinct varieties of mica, muscovite and phlogopite. Muscovite, which is sometimes called white mica, possesses good dielectric properties, particularly at temperatures below 300° C. Phlogopite, or amber mica, has not been considered seriously as a dielectric material.

Development of aircraft and missile propulsion systems, which must operate in high temperature environments, has created a problem of providing a dielectric material which will function in a temperature range of above 300° C. and, more specifically, in the range of 600° C. For example, capacitors must operate at 600° C. with 100 volts, D. C., applied and with a resistivity of at least 0.01 megohm microfarad. Other applications require dielectric materials with higher resistivities or higher voltage at elevated temperatures.

Since muscovite mica is considered a good dielectric material, it appears that this type of mica might be subjected to a temperature of 600° C. and exhibit the required resistivity of at least 0.01 megohm microfarad. However, it was found that resistivity decreased rapidly with temperature increases to provide a below minimum resistivity at this temperature. Thus, muscovite mica was found unsuitable for such high temperature applications.

Our present invention provides an improved method of treating phlogopite mica to form a dielectric material which exhibits a resistivity of over 0.01 megohm microfarad at 600° C.

It is an object of our invention to provide an improved method of heat treating phlogopite mica for subsequent use at temperatures in the range of 300° C. and above.

It is another object of the invention to provide an improved method of treating phlogopite mica which produces a dielectric material with high resistivities at elevated temperatures.

It is a further object of the invention to provide an improved method of treating phlogopite mica to produce a dielectric material with a resistivity of at least 0.01 megohm microfarad at 600° C.

In carrying out our invention in one form, phlogopite mica is heated at a temperature between 850° C. and 1050° C. for a period between one hour and seven hours to provide a dielectric material with high resistivities at elevated temperatures.

These and various other objects, features and advantages of the invention will be better understood from the following description.

Single sheet capacitors were made which employed muscovite dielectrics and stainless steel electrodes. Subsequently these capacitors were heated in an enclosed electric furnace at various elevated temperatures to determine if the dielectric material would retain a high resistivity. We found that resistivity decreased rapidly with temperature increases to provide a resistivity below the necessary minimum of at least 0.01 megohm microfarad at 600° C. Table I shows the results of heating one muscovite mica splitting at elevated temperatures. Thus, muscovite mica appeared unsuitable for use in high temperature applications.

Table I

| Temperature | Capacitance (Picofarads) | Resistivity (Megohm Microfarads) |
|---|---|---|
| 400° C | 793 | 0.21 |
| 500° C | 820 | 0.014 |
| 600° C | 1,415 | 0.002 |

We discovered unexpectedly that a phlogopite mica splitting exhibited a resistivity of more than 0.01 megohm microfarad when it was heated to a temperature of 600° C. Single sheet capacitors, which each employed a phlogopite mica dielectric and stainless steel electrodes, were heated in an electric furnace to several elevated temperatures with results which are shown in Table II.

Table II

| No. | Temperature, °C. | Capacitance (Picofarads) | Resistivity (Megohm Microfarads) |
|---|---|---|---|
| 1 | 300 | 690 | 6.3 |
| 1 | 400 | 715 | 0.65 |
| 1 | 500 | 763 | 0.08 |
| 1 | 600 | 830 | 0.022 |
| 2 | 300 | 940 | 6.9 |
| 2 | 400 | 978 | 0.65 |
| 2 | 500 | 1,040 | 0.08 |
| 2 | 600 | 1,120 | 0.024 |
| 3 | 300 | 560 | 5.1 |
| 3 | 400 | 615 | 0.51 |
| 3 | 500 | 723 | 0.07 |
| 3 | 600 | 760 | 0.020 |

During the development of high temperature dielectric materials, we found, also unexpectedly, that heat treatment of phlogopite mica in an enclosed electric furnace between 850° C. and 1050° C. for a period between one hour and seven hours improved the resistivity of the material when it was subjected to subsequent elevated temperatures. The splitting of phlogopite mica which had been heated in an electric furnace for one hour at 1000° C. exhibited a resistivity of 0.083 megohm microfarad under a subsequent elevated temperature of 600° C.

A splitting of muscovite mica was heated for three hours at 610° C. under conditions similar to the heating of phlogopite mica. This material was heated subsequently at various elevated temperatures as set forth below in Table III to determine its resistivity. A comparison of Table III with Table I discloses that the initial heat treatment of the muscovite mica produced no significant effect on the resistivity of the material.

Table III

| Temperature | Capacitance (Picofarads) | Resistivity (Megohm Microfarads) |
|---|---|---|
| 400° C | 658 | 0.17 |
| 500° C | 727 | 0.014 |
| 600° C | 1,030 | 0.002 |

Since phlogopite mica was heated at a temperature of 1000° C. for one hour, initial heating temperature of muscovite mica was raised to 700° C. for a 2-hour period. Subsequently, the mica was heated to various temperatures as set forth in Table IV. Initial heating at 700° C.

caused a partial mica disintegration as evidenced by low capacitance and an increase in resistivity which was below the minimum resistivity of at least 0.01 megohm microfarad at 600° C. An initial heat treatment at 850° C. or a subsequent prolonged use at 600° C. would result in disintegration of the muscovite mica, which renders this material unsuitable for high temperature applications.

Table IV

| Temperature | Capacitance (Picofarads) | Resistivity (Megohm Microfarads) |
| --- | --- | --- |
| 400° C | 24 | 0.15 |
| 500° C | 28 | 0.027 |
| 600° C | 37 | 0.006 |

The heat treatment of phlogopite mica at a temperature between 850° C. and 1050° C. for a period between one hour and seven hours produced unexpected results which provided an improved dielectric material with high resistivities at elevated temperatures. Furthermore, this improved mica had a resistivity of at least 0.01 megohm microfarad at 600° C. which is necessary for high temperature aircraft and missile propulsion systems. The discovery of this method of heat treatment and the resulting product were totally unexpected since phlogopite mica is not considered seriously as even a good low temperature dielectric material.

Examples of the method of treating phlogopite mica to produce a dielectric material with high resistivity at elevated temperatures in accordance with the present invention are as follows. In each of the following examples, a sheet of phlogopite mica with a thickness of about one mil was split from a book of mica. This sheet was heated in an enclosed electric oven for a definite time period and at a definite temperature. After cooling, each mica sheet was assembled as the dielectric material in a single sheet capacitor using stainless steel electrodes. A direct current of 100 volts was applied from a power source to each capacitor while the capacitor was heated in an enclosed electric furnace to elevated temperatures of 300° C., 400° C., 500° C. and 600° C., respectively. During this heating of each capacitor, the capacitance and resistivity of each heat treated phlogopite mica dielectric were measured. Table V sets forth the example number, initial heating temperature and initial heating period. Table VI discloses the same examples, subsequent elevated temperatures, capacitances and resistivities. The results showed that heat treated phlogopite mica was a good dielectric material which exhibited high resistivities at elevated temperatures.

Table V

| Example | Initial Temperature, ° C. | Time, hours |
| --- | --- | --- |
| 1 | 900 | 3 |
| 2 | 900 | 5 |
| 3 | 900 | 5 |
| 4 | 900 | 7 |
| 5 | 1,000 | 1 |
| 6 | 1,000 | 1 |
| 7 | 1,000 | 1 |
| 8 | 1,000 | 3 |
| 9 | 1,000 | 3 |
| 10 | 1,000 | 3 |
| 11 | 1,000 | 3 |
| 12 | 1,000 | 3 |
| 13 | 1,000 | 3 |

Table VI

| Example | Temperature, ° C. | Capacitance (Picofarads) | Resistivity (Megohm Microfarads) |
| --- | --- | --- | --- |
| 1 | 300 | 320 | 12.8 |
| 1 | 400 | 292 | 1.47 |
| 1 | 500 | 310 | 0.052 |
| 1 | 600 | 370 | 0.015 |
| 2 | 300 | 236 | 39.2 |
| 2 | 400 | 208 | 3.75 |
| 2 | 500 | 320 | 0.160 |
| 2 | 600 | 400 | 0.033 |
| 3 | 300 | 283 | 11.3 |
| 3 | 400 | 254 | 1.50 |
| 3 | 500 | 380 | 0.084 |
| 3 | 600 | 490 | 0.020 |
| 4 | 300 | 151 | 7.6 |
| 4 | 400 |  | 1.9 |
| 4 | 500 | 232 | 0.14 |
| 4 | 600 | 342 | 0.018 |
| 5 | 300 | 147 | 130.0 |
| 5 | 400 | 164 | 18.0 |
| 5 | 500 | 180 | 0.71 |
| 5 | 600 | 210 | 0.064 |
| 6 | 300 | 206 | 43.0 |
| 6 | 400 | 223 | 18.5 |
| 6 | 500 | 249 | 0.62 |
| 6 | 600 | 293 | 0.045 |
| 7 | 300 | 88 | 220.0 |
| 7 | 400 | 104 | 17.2 |
| 7 | 500 | 112 | 0.80 |
| 7 | 600 | 127 | 0.083 |
| 8 | 300 | 170 | 17.0 |
| 8 | 400 | 181 | 2.0 |
| 8 | 500 | 207 | 0.17 |
| 8 | 600 | 240 | 0.040 |
| 9 | 300 | 290 | 22.0 |
| 9 | 400 | 301 | 3.0 |
| 9 | 500 | 327 | 0.21 |
| 9 | 600 | 370 | 0.039 |
| 10 | 300 | 131 | 19.0 |
| 10 | 400 | 127 | 2.0 |
| 10 | 500 | 139 | 0.17 |
| 10 | 600 | 163 | 0.038 |
| 11 | 300 | 240 | 17.0 |
| 11 | 400 | 245 | 1.7 |
| 11 | 500 | 285 | 0.18 |
| 11 | 600 | 364 | 0.036 |
| 12 | 300 | 174 | 44.0 |
| 12 | 400 | 178 | 4.5 |
| 12 | 500 | 200 | 0.15 |
| 12 | 600 | 250 | 0.019 |
| 13 | 300 | 304 | 61.0 |
| 13 | 400 | 319 | 8.0 |
| 13 | 500 | 386 | 0.19 |
| 13 | 600 | 483 | 0.029 |

While other modifications of this invention and variations of the method which may be employed within the scope of the invention have not been described, the invention is intended to include all such as may be employed within the following claims.

What we claim as new and desire to secure by Letters Patent of the United States is:

1. A method of treating phlogopite mica for use as a dielectric material which comprises heating said mica to a temperature between 850° C. and 1050° C. for a period between one hour and seven hours.

2. A method of treating phlogopite mica for use as a dielectric material which comprises heating said mica to a temperature between 850° C. and 1050° C. for a period of three hours.

3. A method of treating phlogopite mica for use as a dielectric material which comprises heating said mica to a temperature between 850° C. and 1050° C. for a period of five hours.

4. A method of treating phlogopite mica for use as a dielectric material which comprises heating said mica to a temperature of about 1000° C. for a period of one hour.

5. A method of treating phlogopite mica for use as a dielectric material which comprises heating said mica to a temperature of about 900° C. for a period of five hours.

References Cited in the file of this patent

Dana: "A Textbook of Mineralogy," John Wiley and Sons, Inc., 1932, page 665.